J. T. FERRES.
INTERNAL COMBUSTION ENGINE.
APPLICATION FILED MAR. 31, 1913.
1,095,565.
Patented May 5, 1914.
3 SHEETS—SHEET 3.
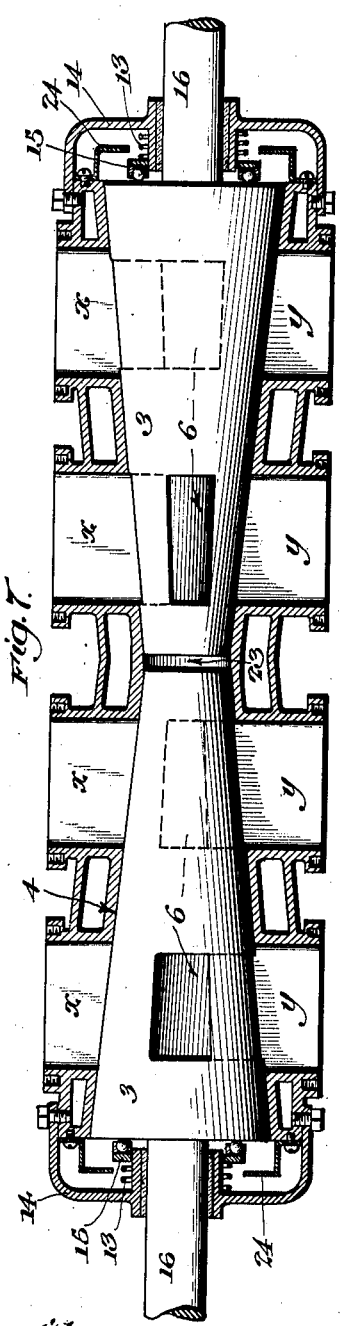
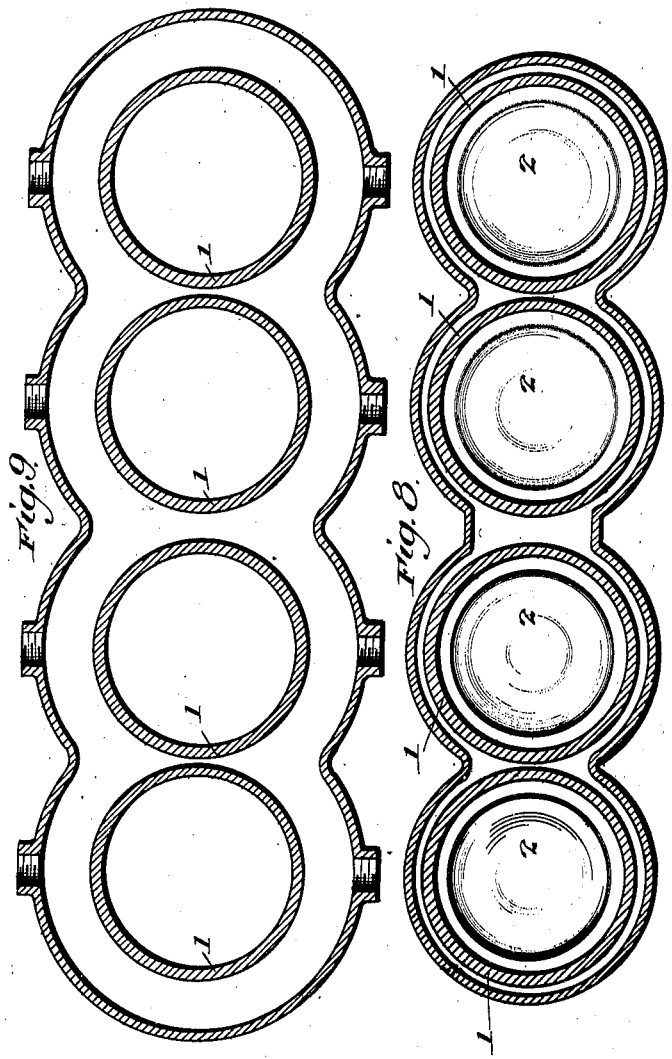

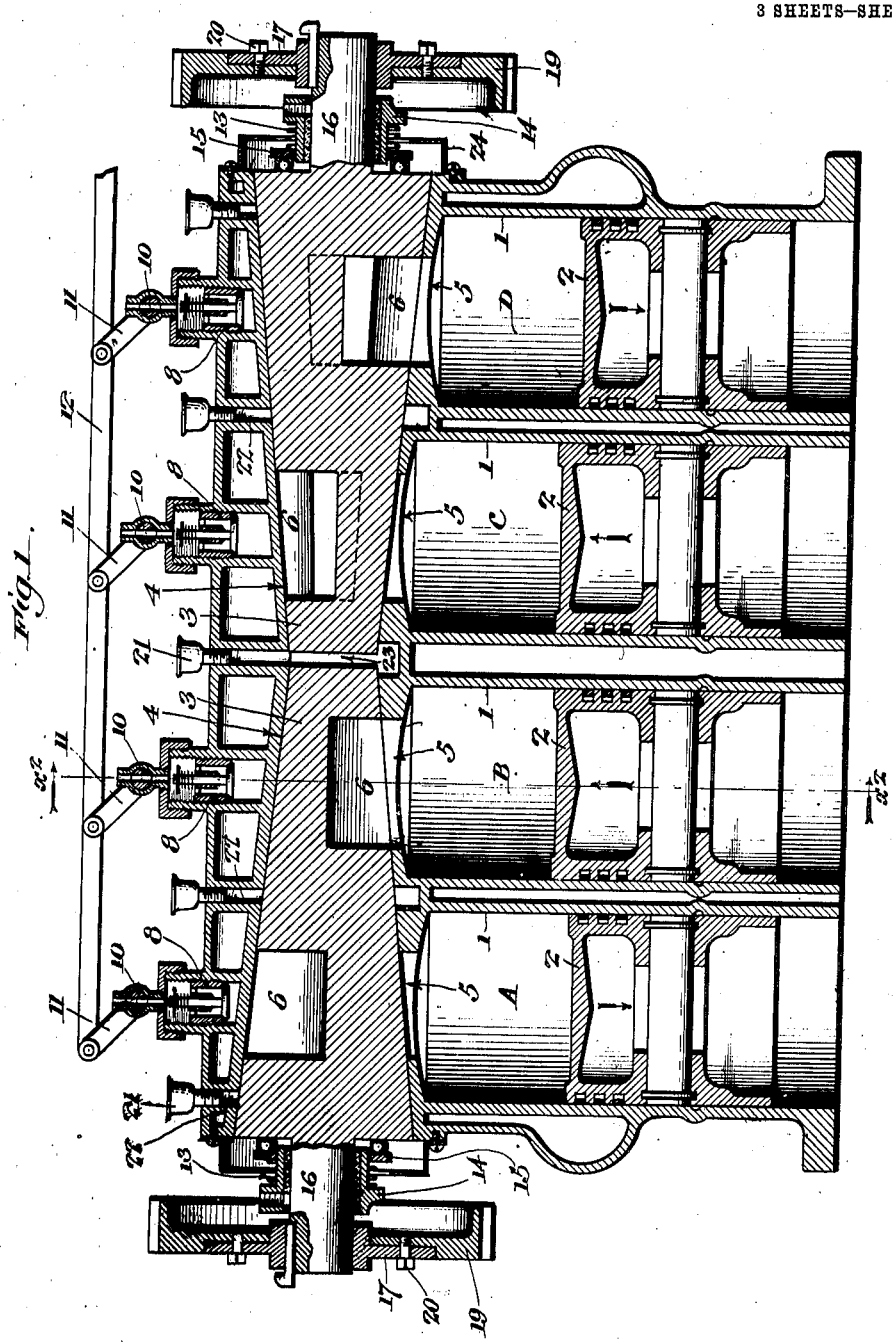

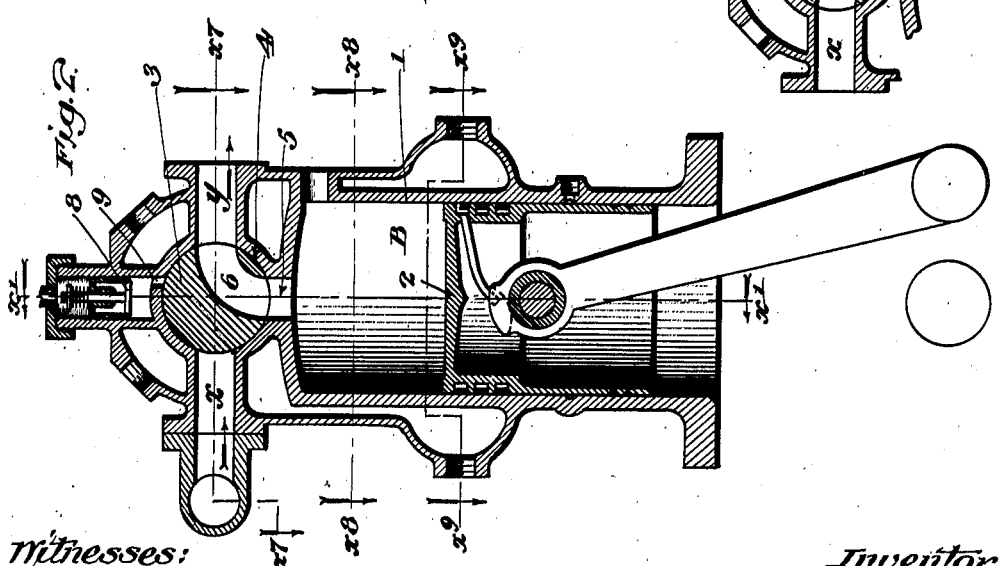

UNITED STATES PATENT OFFICE.

JEFFREY T. FERRES, OF LOS ANGELES, CALIFORNIA.

INTERNAL-COMBUSTION ENGINE.

1,095,565.  Specification of Letters Patent.  Patented May 5, 1914.

Application filed March 31, 1913. Serial No. 758,065.

*To all whom it may concern:*

Be it known that I, JEFFREY T. FERRES, a citizen of the United States, residing at Los Angeles, in the county of Los Angeles, State of California, have invented a new and useful Internal-Combustion Engine, of which the following is a specification.

This invention relates to internal combustion engines and particularly to the valve construction.

The objects of the invention are to provide a valve noiseless in operation, of economical manufacture, having large inlet and outlet ports, and operated with minimum amount of power.

Other objects are to cause the explosion to take place directly over the piston, to provide a large area cooled by the water jacket; to simplify the timing of the valve; and provide a simple and thorough oiling device.

Another object of the invention is to provide a rotary valve with means coöperating with said valve for admitting auxiliary air to the cylinders. The introduction of such auxiliary air may be controlled from any point and serves to economize the use of gasolene and enable the engine to be used as a brake when going down grade.

Another object is to avoid the use of bolts, screws, washers, and springs and provide a valve that is self grinding.

Other objects and advantages will be brought out in the following description.

Referring to the drawings: Figure 1 is a vertical longitudinal section through the engine showing the pistons in mid position. Fig. 2 is a vertical section on line $x^2$—$x^2$, Fig. 1. Fig. 3 is an end elevation of one of the valve gears and supporting flange. Fig. 4 is a view on the same section as Fig. 2, showing the upper portion of the engine with the valve in the position succeeding that shown in Fig. 2. Fig. 5 is a view similar to Fig. 4, showing the valve in the next position succeeding that shown in Fig. 4. Fig. 6 is a view similar to Fig. 5 showing the valve in the next position succeeding that of Fig. 5. Fig. 7 is a section on line $x^7$—$x^7$, Fig. 2. Fig. 8 is a section on line $x^8$—$x^8$, Fig. 2. Fig. 9 is a section on line $x^9$—$x^9$, Fig. 2.

The engine shown herein is a four cylinder engine, but the invention is not limited to that number of cylinders.

1 designates a cylinder in which is a piston 2. The cylinders are suitably water jacketed as shown and may be cast en bloc or in pairs or otherwise as desired. Above the cylinders are two valves 3. These valves are of similar construction, operate simultaneously, and are virtually a unit. Each of the valves is conical and the smaller ends of the valves lie toward each other. These valves are located in valve chambers 4 having tapered seats, and with ports 5, which lead from the cylinders to the valves. As shown in Fig. 1 the two center cylinders B and C are longer than the two other cylinders so that all the ports 5 are of an equal depth to secure uniformity in compression and the passage of the explosive mixture. To offset this difference in the length of the cylinders and maintain uniformity in the cubic capacity of the cylinders, the two center pistons 2 are made correspondingly longer. Thus the displacement and clearance in all the cylinders is the same.

Each valve 3 is provided with a port 6, which as the valve rotates is brought at the proper time into register with its respective ports 5 and with inlet port $x$ and exhaust port $y$ in the valve chamber as shown in Fig. 2. An air inlet valve 8 is arranged above each cylinder above the valve and is adapted to admit air through port 9 to the valve 3, (see Figs. 2 to 6). The valves 8 are automatic, as shown, and the amount of air supplied to them is regulated by valves 10, which are operated by arms 11 connected by a rod 12, so that by operating rod 12 all of the valves 12 will be adjusted simultaneously an equal amount.

In order to hold the valves 3 against their seats I provide a coil compression spring 13 at the outer end of each valve, each spring 13 being supported at its outer end by a stationary bracket 14 and the inner end of the spring bears against a ball thrust bearing 15 at the end of the valve. Springs 13 press the valves 3 against their seats with the requisite pressure.

A shaft 16 projects from the outer end of each valve and secured thereon is a flanged hub 17 having segmental slots 18 to which a gear 19 is secured by cap screws 20, which pass through the slots 18, the elongated slots permitting rotary adjustment of the gear so that the proper timing of the valve may easily be secured. The gears 19 are driven by a chain not shown.

In operation it may be assumed in Fig. 1 that the two center pistons B and C are moving up and the two end pistons A and D moving down. As the piston in cylinder D moves down the port 6 of its valve stands in the relation indicated in Fig. 4, the port 6 being in communication with the cylinder so that the explosive mixture is drawn from the induction manifold, into the cylinder. During this downward stroke of the piston in the cylinder D the port 9 of that cylinder is closed; the port 9 in cylinder A is in communication with the exhaust manifold through the medium of ports 6 and $y$; the port 9 of cylinder B is closed; and the port 9 of cylinder C is in communication with the inlet manifold through the medium of port 6 and port $x$, with the result that as suction is produced in the inlet manifold by downwardly moving piston in cylinder D the explosive mixture is drawn to the cylinder D and at the same time the suction in the inlet manifold also draws in air through check valve 8 of cylinder C (see Fig. 5), this air passing past valve 8, thence through port 9, thence through port 6, thence through port $x$ to the inlet manifold where it mingles with the explosive mixture and is thence drawn through port $x$ of cylinder D (see Fig. 4), thence through port 6 and into the cylinder D. The air which thus passes through the port 6 of the valve in cylinder C cleans that port of the explosive mixture which remains in it after the valve had turned and closed port 5 at the completion of the suction stroke. If this mixture was not thus cleaned out and transferred it would be delivered to the exhaust manifold subsequently and escape without being utilized. The amount of air thus admitted to the mixture in cylinder D dilutes the explosive mixture and the introduction of this auxiliary air into the manifold reduces the suction in the carbureter and less gasolene is drawn into the cylinder. The introduction of this air helps to cool the valve and the air itself becomes heated before entering the mixture in the inlet manifold. The piston in cylinder D having thus moved through its suction stroke and cylinder D having been filled with explosive mixture now commences its outward compression stroke, the valve 3 having at this time turned so that port 6 has passed port 5 and as the piston moves upward the charge in the cylinder D is compressed and when the piston arrives at the upper end of the cylinder the ignition takes place. When the piston has arrived substantially at the middle of the compression stroke, the valve 3 has turned into the position shown in Fig. 5 and when the piston has reached the end of the compression stroke the valve 3 has moved port 6 out of communication with port $x$. Upon ignition the piston in cylinder D moves downward through its working stroke, the valve 3 turning to the next position, and in the stroke at completion stands with port 6 just cut off from communication with exhaust port $y$ and the valve 3 stands in the position shown in Fig. 6. During this movement the port 6 places port 9 of the auxiliary air valve in communication with the exhaust passage $y$, but no air passes from the auxiliary air valve to exhaust port $y$ because the auxiliary air valve is closed by its spring and no suction is exerted through the exhaust manifold on the air valve 8. The piston in cylinder D then commences its upward scavenging stroke and the valve 3 meanwhile turns and as soon as its port 6 commences to open to port 5 the exhaust gas from cylinder D passes out through port 5 into port 6 and thence to port $y$, thus completing four cycles of operation of the cylinder B. The other cylinders operate in succession in like manner. The regulation of this auxiliary air is effected by means of rod 12 which may be extended to any continued point such as the dashboard of an automobile. If it is desired to have the engine act as a brake in going down grade, the rod 12 may be adjusted to permit the maximum amount of air to pass through the check valves 8 and this will so minimize the suction on the carbureter that no gasolene will be drawn into the cylinders and the engine will thus act as a brake, the air which is drawn into the cylinders being compressed therein by the pistons.

The valves are located directly over the heads of the cylinders, so that the explosive mixture is admitted through ports 5 at a point directly above the piston with the result that when the explosion takes place it is in the most advantageous position to exert the maximum pressure against the pistons, thereby giving the maximum power. The valve is so constructed that one port 5 serves for both the inlet and exhaust, thereby enabling much larger ports to be used than where separate ports are necessitated for the inlet and exhaust. In fact, the maximum size of port may be employed.

Lubrication is afforded by oil cups 21 which communicate with ducts 22 leading to surfaces of the valves between ports 6. The center duct 22 leads to a space 23 between the ends of the valves. Thus oil is distributed at three points to each valve, and the valve is thereby thoroughly lubricated. Oil retaining flanges 24 are secured at each outer end of the valve chambers and serve to receive any oil which works outward from between the valves and their seats.

The conical shape of the valve is such that a perfect fit of the valve against its seat is always maintained by the pressure of the spring 13. This also prevents the accumulation of carbon, as the valve in rotating continually scrapes away any formation of carbon. As there are no reciprocating parts or tappets, the valve is noiseless and is operated by the minimum power. As the ports 6 are permanently fixed in position, it is impossible to disarrange the timing, the only adjustment required being that of securing proper relation to the position of the piston, and this is readily accomplished by means of the segmental slots 18 in the flanges 17 which permit rotary adjustment of the gears with respect to the shafts 16. By using two valves as shown I am enabled to secure the requisite angularity of taper without making the large end of the valve unduly large. If a single valve were employed its large end would be twice the size of the large end of either of the valves shown, assuming that the degree of taper were as great as in the present instance. Thus with this construction I am enabled to maintain this taper and yet keep the large ends of the valves of a desirably small size.

What I claim is:

1. In an internal combustion engine, a plurality of cylinders with a valve chamber extending transversely at one end thereof, the head of each cylinder having a port extending to the valve chamber, a valve in said chamber with a plurality of ports having paths of movement in register with the ports leading from the cylinders, a manifold with which the valve ports are adapted to communicate and means for transferring the explosive mixture which remains in a valve port from the valve port back to the manifold.

2. In an internal combustion engine, a plurality of cylinders with a transverse tapered valve chamber at one end, the heads of the cylinders having ports extending to the valve chamber, a tapered valve in said chamber having ports adapted to be moved into register with the cylinder ports, an inlet manifold communicating with the respective valve ports, and means for admitting air to a valve port when said valve port is in communication with said air admission means and said inlet manifold.

3. In an internal combustion engine, a plurality of cylinders with a transverse tapered valve chamber at one end, the heads of the cylinders having ports extending to the valve chamber, a tapered valve in said chamber having ports adapted to be moved into register with the cylinder ports, an inlet manifold communicating with the respective valve ports, a series of auxiliary air inlet ports adapted to communicate with the respective valve ports, the wall of the valve chamber having a series of ports which communicate with the respective auxiliary air inlet valves and are in the path of movement of the respective ports in the first named valve.

4. In an internal combustion engine, a plurality of cylinders with a transverse tapered valve chamber at one end, the heads of the cylinders having ports extending to the valve chamber, a tapered valve in said chamber having ports adapted to be moved into register with the cylinder ports, an inlet manifold communicating with the respective valve ports, a series of auxiliary air inlet ports adapted to communicate with the respective valve ports, the wall of the valve chamber having a series of ports which communicate with the respective auxiliary air inlet valves and are in the path of movement of the respective ports in the first named valve, and means for simultaneously regulating the amount of air admitted to said auxiliary air valves.

5. In an internal combustion engine, a plurality of cylinders with two valve chambers extending transversely at one end thereof, said valve chambers being tapered with their smaller ends adjoining, tapered valves in the respective valve chambers, said cylinders having ports communicating with said valves, said cylinders being graded in length to maintain equal distance between the heads of the cylinder and valves, pistons in the cylinders, said pistons being graded in length to maintain uniform displacement in the cylinders.

6. In an internal combustion engine, a plurality of cylinders with a tapered valve chamber extending transversely at one end thereof, a tapered valve in said chamber, the cylinders being graded in length to maintain a uniform distance between the ends of the cylinders and valve, pistons in the cylinders, said pistons being graded in length to maintain uniform displacement in the cylinders.

7. In an internal combustion engine, a plurality of cylinders with tapered valve chambers at one end thereof, said valve chambers having their smaller ends adjoining, and formed with an oil groove at their small ends and formed with oil grooves at intermediate points, tapered valves in said valve chambers, said valves having ports in line with the respective cylinders, each of said valve ports having openings in the side of the valve substantially 90 degrees apart, said valve chamber having inlet ports and exhaust ports on diametrically opposite sides of said valves, and means for rotating said valves.

8. In an internal combustion engine, a plurality of cylinders with a transverse tapered valve at one end thereof, the heads of the cylinders each having one port extending to the valve chamber, a rotatable tapered valve in said chamber having one port for each cylinder, the width of said valve port being substantially one-eighth of the circumference of the valve and having its two openings at approximately right angles to each other.

In testimony whereof, I have hereunto set my hand at Los Angeles, California this 17th day of March, 1913.

JEFFREY T. FERRES.

In presence of—
GEORGE T. HACKLEY,
MARTHA M. LANGE.